(12) United States Patent
Dayan

(10) Patent No.: US 9,292,168 B2
(45) Date of Patent: *Mar. 22, 2016

(54) GRAPHIC-BASED ELECTRONIC SIGNATURE MANAGEMENT SYSTEM AND METHOD

(71) Applicant: Jacob J. Dayan, Neptune, NJ (US)

(72) Inventor: Jacob J. Dayan, Neptune, NJ (US)

(*) Notice: Subject to any disclaimer, the term of this patent is extended or adjusted under 35 U.S.C. 154(b) by 227 days.

This patent is subject to a terminal disclaimer.

(21) Appl. No.: 14/164,515

(22) Filed: Jan. 27, 2014

(65) Prior Publication Data

US 2014/0208247 A1    Jul. 24, 2014

Related U.S. Application Data

(60) Division of application No. 13/669,921, filed on Nov. 6, 2012, now Pat. No. 8,677,256, which is a continuation-in-part of application No. 13/340,491, filed on Dec. 29, 2011.

(51) Int. Cl.
| | | |
|---|---|---|
| G06F 3/0482 | (2013.01) | |
| G06F 3/0481 | (2013.01) | |
| G06F 17/30 | (2006.01) | |
| G06F 3/0484 | (2013.01) | |
| G06Q 10/00 | (2012.01) | |

(52) U.S. Cl.
CPC .......... *G06F 3/04817* (2013.01); *G06F 3/0482* (2013.01); *G06F 3/04842* (2013.01); *G06F 17/30882* (2013.01); *G06Q 10/00* (2013.01)

(58) Field of Classification Search
CPC .................................................. G06F 3/0482
USPC ......................................................... 715/763
See application file for complete search history.

(56) References Cited

U.S. PATENT DOCUMENTS

| | | | |
|---|---|---|---|
| 5,909,687 A * | 6/1999 | Tapper | B42F 5/00 |
| 6,873,861 B2 * | 3/2005 | Awada | H04M 1/274516 379/93.09 |
| 7,246,099 B2 * | 7/2007 | Feldhahn | G06Q 10/107 705/500 |
| 7,753,260 B2 * | 7/2010 | Kanatani | G06F 17/212 235/380 |
| 7,974,877 B2 * | 7/2011 | Ramanathan | G06Q 10/10 705/14.49 |

(Continued)

FOREIGN PATENT DOCUMENTS

| | | |
|---|---|---|
| KR | 20020074236 A | 9/2002 |
| KR | 1020090025531 A | 3/2009 |
| WO | 2010122429 A2 | 10/2010 |

OTHER PUBLICATIONS

Working screenshot of outlook 2007 manufactured by Microsoft, released on Jan. 2007, 28 pages.*

(Continued)

*Primary Examiner* — Reza Nabi
(74) *Attorney, Agent, or Firm* — Avyno Law P.C.

(57) ABSTRACT

A computer-implemented system for managing an electronic signature is provided. A data collector receives one or more contact information items. A signature builder builds a graphic-based electronic signature based on at least one of the contact information items. The graphic-based electronic signature includes a set of icons. Individual icons in the set of icons are respectively associated with at least one of the contact information items. Individual icons in the set of icons are configured to initiate a communication application when one of the icons is selected in order to communication via the communication application using the contact information item associated with the selected icon.

17 Claims, 11 Drawing Sheets

(56) References Cited

U.S. PATENT DOCUMENTS

| | | | | |
|---|---|---|---|---|
| 8,677,256 | B2* | 3/2014 | Dayan | G06F 17/30882 715/700 |
| 2005/0091074 | A1* | 4/2005 | Feldhahn | G06Q 10/107 705/65 |
| 2005/0103838 | A1* | 5/2005 | Slotkin | G07F 17/26 235/380 |
| 2005/0182644 | A1* | 8/2005 | Douvikas | G06F 17/30067 705/26.1 |
| 2005/0251448 | A1* | 11/2005 | Gropper | G06Q 10/1093 705/14.61 |
| 2006/0075050 | A1* | 4/2006 | Kanatani | G06F 17/212 709/206 |
| 2006/0293904 | A1* | 12/2006 | Ramanathan | G06Q 10/00 709/206 |
| 2006/0293905 | A1* | 12/2006 | Ramanathan | G06Q 10/10 709/206 |
| 2007/0265985 | A1* | 11/2007 | Feldhahn | G06Q 10/107 705/65 |
| 2009/0019376 | A1* | 1/2009 | Quillen | H04L 67/36 715/753 |
| 2009/0049070 | A1* | 2/2009 | Steinberg | G06F 17/3089 |
| 2009/0049389 | A1* | 2/2009 | Kuzmanovic | G06F 9/4443 715/745 |
| 2010/0070302 | A1* | 3/2010 | Murawski | G06Q 10/06 705/3 |
| 2010/0077302 | A1* | 3/2010 | Bostrom | G06Q 10/10 715/700 |
| 2010/0088105 | A1* | 4/2010 | Feldhahn | G06Q 10/00 705/1.1 |
| 2010/0205545 | A1* | 8/2010 | Dawson | G06Q 10/107 715/758 |
| 2010/0306659 | A1* | 12/2010 | Shahine | G06Q 30/02 715/733 |
| 2011/0078729 | A1* | 3/2011 | LaJoie | G11B 27/28 725/36 |
| 2011/0145049 | A1* | 6/2011 | Hertel | G06Q 20/02 705/14.23 |
| 2011/0173298 | A1* | 7/2011 | Nam | G06Q 10/10 709/219 |
| 2012/0009036 | A1* | 1/2012 | Marcos | B44B 3/006 409/84 |
| 2012/0016939 | A1* | 1/2012 | Cheah | G06Q 10/06 709/205 |
| 2012/0087537 | A1* | 4/2012 | Liu | G06K 9/00469 382/100 |
| 2012/0150970 | A1* | 6/2012 | Peterson | G06F 3/04817 709/206 |
| 2012/0290601 | A1* | 11/2012 | Huang | G06K 9/00469 707/769 |
| 2013/0031193 | A1* | 1/2013 | Cheah | G06Q 10/06 706/206 |
| 2013/0060867 | A1* | 3/2013 | Davis | H04L 51/28 709/206 |

OTHER PUBLICATIONS

"Clickable social media Icons in your OS X Mail.app.signature"; Dec. 1, 2009; retrieved from the Internet on Jun. 18, 2015: URL: https://www.youtube.com/watch?v=p025YE-g2eM.

"Social Media Clickable Icons in Mail Signature"; Mar. 11, 2010; retrieved from the Internet on Jun. 18, 2015: URL: https://www.youtube.com/watch?v=Er6ZvV8Ka-Q.

"How to Put Social Media Icons in Your Email Signature"; Jan. 12, 2011; retrieved from the Internet on Jun. 18, 2015: URL: https://www.youtube.com/watch?v=7QgLiflguic.

Microsoft; Working screenshot of Outlook 2007 manufactured by Microsoft; released on Jan. 2007; 28 pp.

* cited by examiner

FIG. 3

```
<span style='font-size: medium;'><strong>Bob Cobb</strong></span>
<br />
<span style='color:black;'><em>Executive Chef</em></span>
<span style='color:black;'><em>, </em></span>
<span style='color:black;'><em>Brown Derby Hotel (Los Angeles)</em></span>
<br />
<table cellpadding='1' cellspacing='0'>
        <tr>
                <td>
                        <a href='http://www.sigbop.com/Vcard.aspx?ButtonId=509637de-a8d2-4c2c-a93f-
                        11a8ba388735'>

<img alt='Bob Cobb' src='http://www.sigbop.com/Images/Buttons/VCARD.png' border='0'
                                height='32' width='32' style='padding-right:3px;' >

</a>
                </td>
                <td>
                        <a href='mailto:bcobb@bdh.com'>
                                <img alt=bcobb@bdh.com'
                                src='http://www.sigbop.com/Images/Buttons/PRIMARYEMAIL.png' border='0' height='32'
                                width='32' style='padding-right:3px;'>
                        </a>
                </td>
                <td>
                        <a href=tel:'+1-(123)-555-1234'>
                                <img alt='tel:+1-(123)-555-1234'
                                src='http://www.sigbop.com/Images/Buttons/WORKPHONE.png' border='0' height='32'
                                width='32' style='padding-right:3px;' >
                        </a>
                </td>
                <td>
                        <a href=tel:'+1-(123)-555-1235'>
                                <img alt='tel:+1-(123)-555-1235'
                                src='http://www.sigbop.com/Images/Buttons/HOMEPHONE.png' border='0' height='32'
                                width='32' style='padding-right:3px;' >
                        </a>
                </td>
                <td>
                        <a href=tel:'+1-(123)-555-1236'>
                                <img alt='tel:+1-(123)-555-1236'
                                src='http://www.sigbop.com/Images/Buttons/CELLPHONE.png' border='0' height='32'
                                width='32' style='padding-right:3px;' >
                        </a>
                </td>
                <td>
                        <a href=tel:'+1-(123)-555-1237'>
                                <img alt='tel:+1-(123)-555-1237'
                                src='http://www.sigbop.com/Images/Buttons/PRIMARYFAXPHONE.png' border='0'
                                height='32' width='32' style='padding-right:3px;' >
                        </a>
                </td>
                <td>
                        <a href='http://www.sigbop.com/Redirect.aspx?ButtonId=351795a3-6315-4386-8d41-
                        9d989e70f7d6'>
                                <img alt='Facebook' src='http://www.sigbop.com/Images/Buttons/facebook.png'
                                border='0' height='32' width='32' style='padding-right:3px;'>
                        </a>
                </td>
        </tr>
</table>
```

FIG. 7

GRAPHIC-BASED ELECTRONIC SIGNATURE MANAGEMENT SYSTEM AND METHOD

RELATED APPLICATION

This application is a divisional application and claims the priority benefit of continuation-in-part U.S. patent application Ser. No. 13/669,921 filed Nov. 6, 2012, titled GRAPHIC-BASED ELECTRONIC SIGNATURE MANAGEMENT SYSTEM AND METHOD that is a continuation-in-part of U.S. patent application Ser. No. 13/340,491 filed Dec. 29, 2011, titled "GRAPHIC-BASED ELECTRONIC SIGNATURE MANAGEMENT SYSTEM AND METHOD," which all application are hereby incorporated in its entirety by reference.

FIELD OF THE INVENTION

The present invention relates to electronic communications and more particularly to electronic signatures for presenting contact information.

BACKGROUND

The means with which user of computing devices can communicate with each other continues to grow. Where individuals may once have been reached at one or two telephone numbers, users may presently be reached via, for example, multiple telephone numbers (e.g., home, work, and mobile), home and work fax numbers, multiple email addresses, personal and professional web pages, and various social networking profiles (e.g., Facebook, Twitter, etc.).

Given the amount of contact information individuals currently maintain, a need exists for a new approach to managing, organizing, and presenting the various ways individuals may be contacted.

SUMMARY

A computer-implemented system for managing an electronic signature is provided. A data collector receives one or more contact information items. A signature builder builds a graphic-based electronic signature based on at least one of the contact information items. The graphic-based electronic signature includes a set of icons. Individual icons in the set of icons are respectively associated with at least one of the contact information items. Individual icons in the set of icons are configured to initiate a communication application when one of the icons is selected in order to communication via the communication application using the contact information item associated with the selected icon.

A computer-implemented method for managing an electronic signature is also provided. One or more contact information items are received. A graphic-based electronic signature is built, and the graphic-based electronic signature corresponds to at least one of the contact information items. The graphic-based electronic signature may also include a set of icons. Individual icons in the set of icons are associated with respective contact information items or any other type of electronic information that may be linked to over a network. Individual icons in the set of icons are also configured to initiate a communication application when one of the icons is selected in order to communicate via the communication application using the contact information item associated with the selected icon.

A computer-implemented method of sponsoring an electronic signature is additionally provided. One or more third-party contact information items may be received. The third-party contact information items are respectively associated with a third-party icon. A set of third-party icon selections is also received. Individual selections in the set of third-party icon selections respectively correspond to third-party icons selected for inclusion in a graphic-based electronic signature. The graphic-based electronic signature is built, at least in part, based on the set of third-party icon selections.

A computer-implemented system for locally managing an electronic signature is further provided. A data collector may receive one or more contact information items. A signature builder builds a graphic-based electronic signature based on at least one of the contact information items. The graphic-based electronic signature may include a set of icons. Individual icons in the set of icons are respectively associated with at least one of the contact information items. Individual icons are also configured to initiate a communication application when one of the icons is selected in order to communicate via the communication application using the contact information item associated with the selected icon. Additionally the signature builder is configured to access signature-related information stored remotely relative to the signature builder.

A computer-implemented approach for managing an electronic signature is also provided. One or more contact information items are received. A graphic-based electronic signature is built, and the graphic-based electronic signature corresponds to at least one of the contact information items. The graphic-based electronic signature may also include a set of icons. Individual icons in the set of icons are associated with respective contact information items. The Individual icons may be of picture graphic files selected and retrieved over a network. Individual icons in the set of icons are also configured to initiate a communication application when one of the icons is selected in order to communicate via the communication application using the contact information item associated with the selected icon.

BRIEF DESCRIPTION OF THE DRAWINGS

FIG. 3 is an example of an implementation of a web interface of a graphic-based electronic signature management system.

FIG. 7 is an example of an implementation of the graphic-based electronic signature of FIG. 6.

DETAILED DESCRIPTION

A system for building and managing a graphic-based electronic signature is provided. The term electronic signature system described is an electronic content management system and not limited to only signatures in electronic mail. The use of the term email is meant to include not only traditional email, but other types of electronic communication (i.e. instant messaging, ssm, and other types of electronic messages. The graphic-based signature ("signature") includes one or more selectable icons that are each associated with a contact information item. A user may append the signature to an electronic communication, e.g., an email, web page, text message, instant messaging, etc .... When the recipient views the electronic communication, the signature is displayed as an array of selectable icons. The recipient may select one of the icons in the signature to initiate a new electronic communication with the sender using the contact information associated with the selected icon or connect to other information associated with the icon. Selectable icons may be a button that is selectable in a user interface, where the button is an image, text, hyperlink, or other selectable user interface element.

Furthermore, the email signature may be a collection of text and images (icons) located at the bottom of an email that is sent. One of the icons may connect to other information associated with the icon, such a Twitter page or other social network. An icon may also be provided that is associated with some kind of branded company message and could be configured to appear in the email signature of every message a company sends. The icon's associated links, data, and contact information may be updated at any time and previously sent message signatures would access the updated information. Thus, enabling the content accessed by icons to be changed based upon time, date, or location automatically or anytime manually. These features and additional features will be discussed in further detail below.

Graphic-Based Electronic Signature Management System

Figure 1:
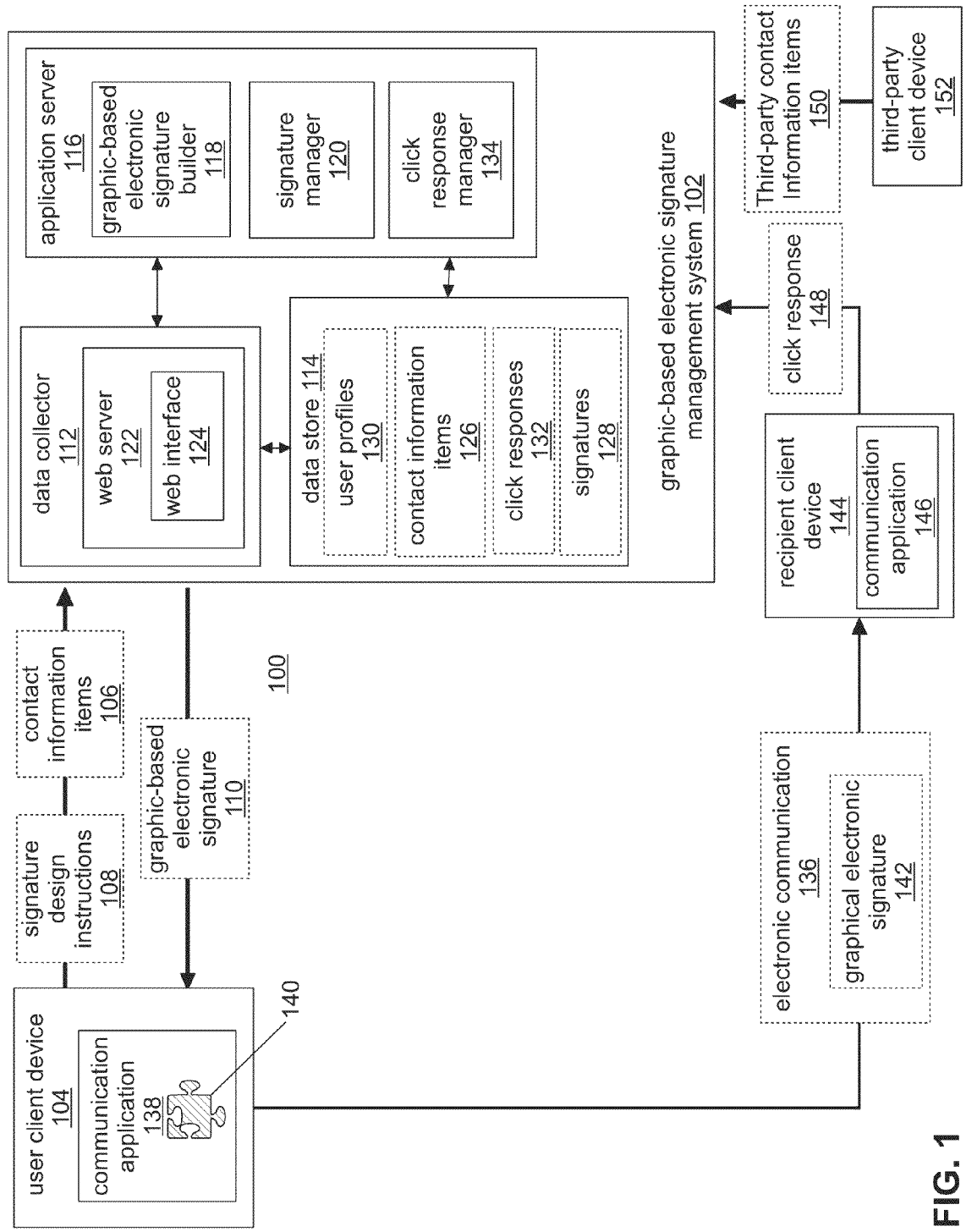
FIG. 1 is an example of an implementation of a graphic-based electronic signature management system.

Referring to FIG. 1, an example 100 of an embodiment of a graphic-based electronic signature management system 102 is shown. As seen in this example, the system 102 may be in signal communication with a user client device 104. The system 102 receives contact information items 106 and signature design instructions 108 from the user client device 104, and the system provides a graphic-based electronic signature 110 that includes one or more of the contact information items back to the user client device. The system 102 and user client device 104 may communicate via a network such as, for example, a packet-based network, e.g., the Internet. Accordingly the system 102 and user client device 104 may communicate, for example, using an HTTP request/response exchange (HyperText Transfer Protocol). The system 102 and user client device 104 may also communicate via other types of networks such as, for example, cellular networks.

Contact information items 106 include, for example, the following information about a user: first, middle, and last name; job title; company name; personal and professional mailing addresses; personal and professional email address; personal and professional phone numbers (e.g., home, work, and mobile); personal and professional facsimile numbers; personal and professional web pages; and various social networking profiles (e.g., Facebook, Twitter, Google+, Flickr, etc.). Various combinations of contact information items may be included in one or more graphic-based electronic signatures for a user. A graphic-based electronic signature 110 may also include links to websites or data a creator may wish to share.

Signature design instructions 108 relate to the construction of a graphic-based electronic signature 110. For example, a user may create multiple signatures using the graphic-based electronic signature management system, e.g., a personal signature containing personal contact information items and a professional signature containing professional contact information items. Signature design instructions 108 may also specify which contact information items should be included in a signature as well as the order of contact information items 106 included in a signature. Additionally signature design instructions 108 may specify a particular icon (i.e., graphic or image) to associate with a contact information item 106.

The client devices may be any type of computing device that is able to be configured to communicate via a network, e.g. a packet-switched network such as the internet. Client devices may include, for example, desktop computers, laptop computers, tablet computers, palmtop computers, mobile telephones, videogame consoles, network-enabled televisions, and the like.

The system 102 includes various components in signal communication with each other that facilitate the receipt of contact information items 106 from the user client device 104 and the construction and management of graphic-based electronic signatures. In this example, the system includes: a data collector 112 for collecting the contact information items 106 and signature design instructions 108 from the user client device 104; a data store 114 for storing signature-related information; and an application server 116 that facilitates the construction and management of graphic-based electronic signatures. The components of the system 102 may reside on a single computing device or distributed among multiple computing devices in signal communication with each other.

As seen in FIG. 1, the signature builder 118 and signature manager 120 reside remotely at the application server 116 of the system. In an alternative embodiment, as shown by way of example in FIG. 2, the graphic-based signature builder and the signature manager 120 may reside locally at the user client device 104 as components of a local application. The local application, in this example, requests and receives signature information 208 from the remote graphic-based electronic signature management system 102. The local application may present the signature information to the user via the local application 202, and the user may provide signature design instructions to locally construct a signature using the graphic-based signature builder 118 of the local application 202. The user may also, for example, create, modify, or delete signatures locally using the signature manager 120 of the local application 202. Contact information items and signatures are still stored remotely at the graphic-based electronic signature management system 102 in this alternative example. Furthermore, the local application 202 transmits signature management instructions 204 corresponding to the creation, modification, and deletion of signatures locally via the local application 202. In response to receipt of the signature management instructions 204 at the remote system, the application server 116 updates the signature-related information stored 114 at the data store based on the signature management instructions received. Because the data is collected locally via the local application 202, the remote system, in this example, does not include a combination web server 122/web interface 124, and instead just includes a web server 206 to receive the signature management instructions from the local application 202.

Referring back to FIG. 1, the data collector 112, in this example, includes a web 122 server and a web interface 124 for exchanging communications with the user client device 104. A user at the user client device may interface with the graphic-based electronic signature management system 102 via the web interface 124 using, for example, a web browser (not shown). In response to commands or instructions received at the web browser from the user, the user client device 104 may transmit requests, e.g. HTTP requests, to the system. The web server 122 may receive the requests and forward the requests to the application server 116 for processing. The application server 116 may process the request, and the web server 122 may generate a response, e.g., an HTTP response, and transmit the response back to the user client device 104.

The data store 114, in this example, stores signature-related information and other user-related information. Signature-related information includes the contact information items 126 and the signatures 128 constructed by a user. User-related information may include user profile 130 information provided by a user when registering for access to the system, e.g., access credentials such as a username and password. The user may supply the access credentials to an authentication module (not shown) at the system to gain access to other component of the system. As discussed further below, the data store may also store click responses 132 to track when a recipient selects one of the selectable icons in a graphic-based electronic signature. The data store may be, for example, a database stored on a computer memory, and the system may include a database management system (not shown) to facilitate the storage and retrieval of information stored in the database.

The application server 116 facilitates the construction and management of graphic-based signatures based on the contact information items 106 and signature design 108 instructions received from the user via the user client device 104. Accordingly, the application server includes various modules to facilitate the construction and management of the signatures. The application server 116, in this example, includes a signature builder 118 for constructing signatures and a signature manager 120 for managing the signatures. Users may access the graphic-based signature builder 118 and signature manager 120 via, for example, the web interface 124. As discussed further below, the application server 116 may also include a click response manager 134 for tracking recipient selections of selectable icons of signatures received in electronic communications 136.

The signature manager 120 enables a user to perform signature management-related tasks. Management-related tasks include, for example: creating a new signature; selecting a signature to modify; and deleting or archiving a signature. When creating a new signature, for example, the signature manager 120, in this example, creates a new signature record in the data store. When modifying a signature, the signature manager 120, in this example, retrieves the signature information for the existing signature from the data store 114. It is noted that, in some implementations, modifying a signature may result in the modification of previously sent signatures that access the data store 114. And when deleting a signature, the signature manager 120, in this example, deletes the record associated with the signature from the data store.

The signature builder 118, in this example, may construct a signature based on signature design instructions 108 received from the user via the user client device 104. Construction of the graphic-based electronic signature may additionally or alternatively be automatic. The signature builder 118 may include, for example, a set of default selectable icons in the signature under construction. Additional user-selected selectable icons may be added to the signature based on the signature design instructions received at the signature builder 118. As mentioned above, the signature builder 118 facilitates the selection of contact information items to include in the signature under construction and the arrangement of the selectable icons in the signature under construction. A user may add contact information items to the signature, remove contact information items from the signature, or rearrange contact information items within the signature.

Figure 3:
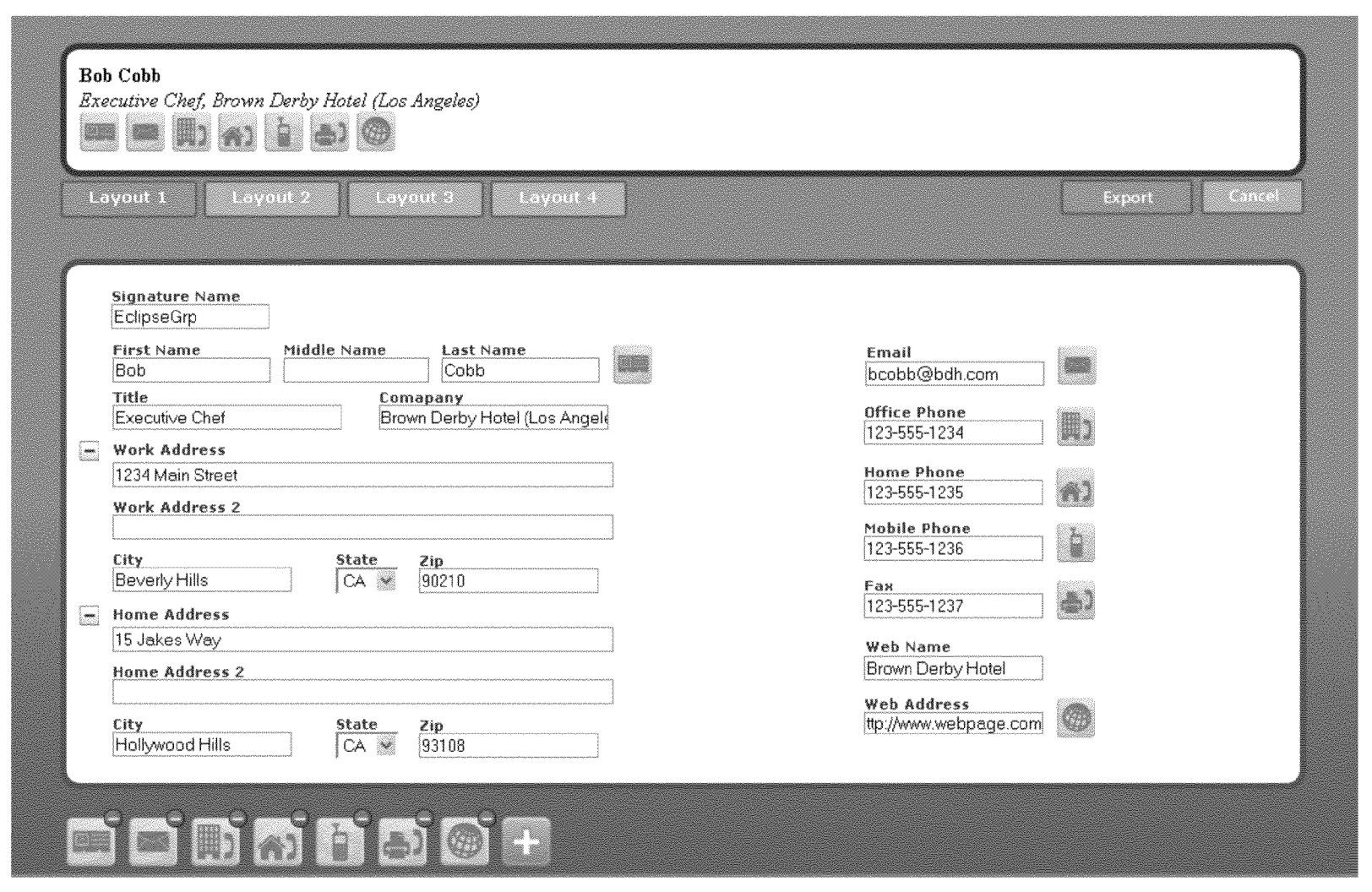

With additional reference to FIG. 3, an example of an implementation of a web interface for constructing a graphic-based electronic signature is shown. The signature builder receives signature design instructions as user input via the web interface. The web interface presents a web form having various input elements for collecting contact information from a user. The web form of the web interface, in this example, includes multiple text boxes respectively associated with one type of contact information, e.g., name, title, company, work address, home address, phone numbers, email address, mailing address, fax number, web page, and web page address.

The web interface, in this example, also includes a preview display of the signature under construction. In this example, the layout of the signature includes: a first line displaying the first and last name of the user; a second line displaying the title and company of the user; and a third line displaying the set of selectable icons respectively associated with the contact information items. As contact information items are added to the web form, the signature builder may automatically add to the signature under construction a selectable icon for the contact information item. The web interface, in this example, also includes a set of buttons for removing selectable icons from the signature under construction. In this way, the user may control what contact information items stored in the data store appear in the signature.

Figure 11:
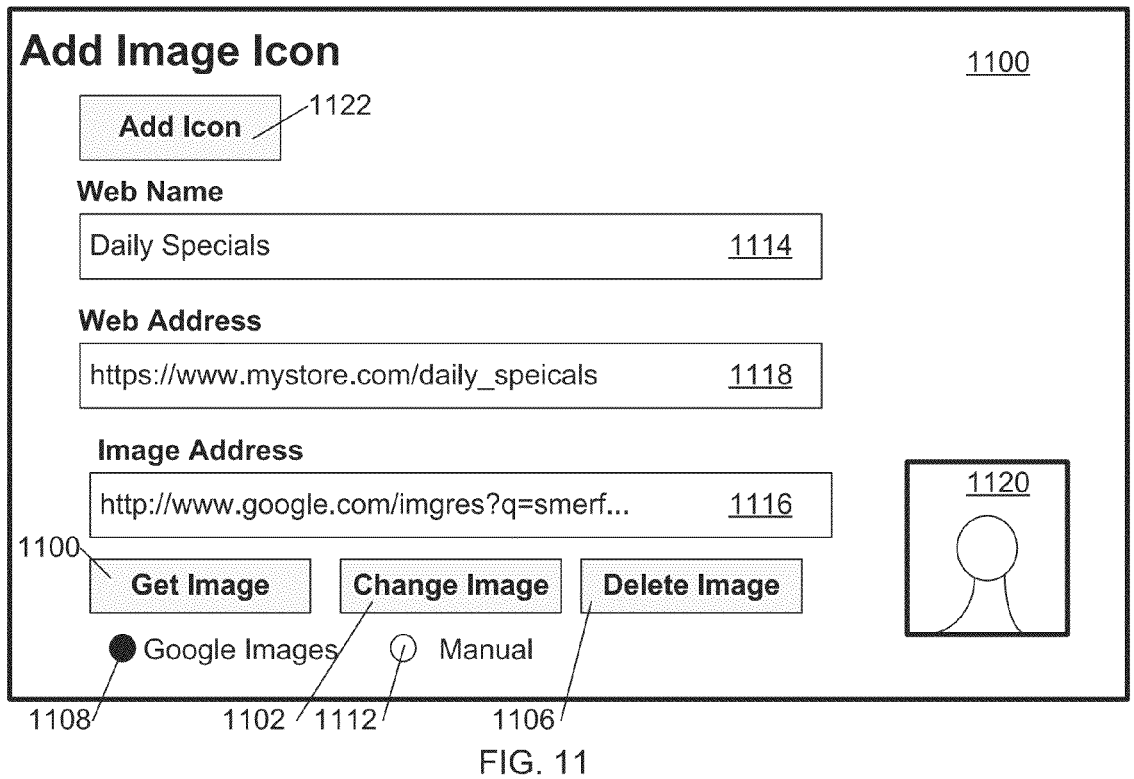
FIG. 11 is an example of an implementation of an input dialog for selecting an image for a selectable icon.

In FIG. 11, an example of an implementation of an input dialog "Add Image Icon 1100 for selecting an image for a selectable icon is depicted. A selectable icon may be created using the signature builder that may have user selectable buttons for "change image" 1102, "get image" 1104, and "delete image" 1106. If a user selects the "get image" 1104 or "change image" 1102 buttons, a number of images from a web based image store, such as GOOGLE IMAGES may be accessed.

Image stores may be identified in the input dialog display, such as Google Images 1108, or manual entry 1112. The "Google Images" 1108 is shown as being selected in FIG. 11. Once selected, the "Web Name (Search Term) 1114 text box may be used to search Google Images and select an image. The user may then select an image that is downloaded and formatted for being displayed as a selectable icon in the signature. The web address of the selected image may then be displayed an "Image Address" text box 1116. The web address or other data that is to be associated with image icon once it is formatted as a selectable icon is identified in the "Web Address" text box 1118. The selected image may also be displayed in an image area 1120. The selectable image icon may be created once the information has been collected and displayed in the Add Image Icon window 1100 by selecting the Add Icon button 1122. In other implementations, the address or part of the address to access the image is retrieved and used in the signature to display the selected image as a selectable icon in the signature. Once selected in the selectable icon may cause some action to occur such as a user associated web page to be open or associated data to be presented. The "change image" button enables one image associated with the selectable icon to be changed to a different image using an approach similar to "get image". The difference being "get image" adds an image to the selectable icon while "change image" replace one image with another image.

Figure 12:
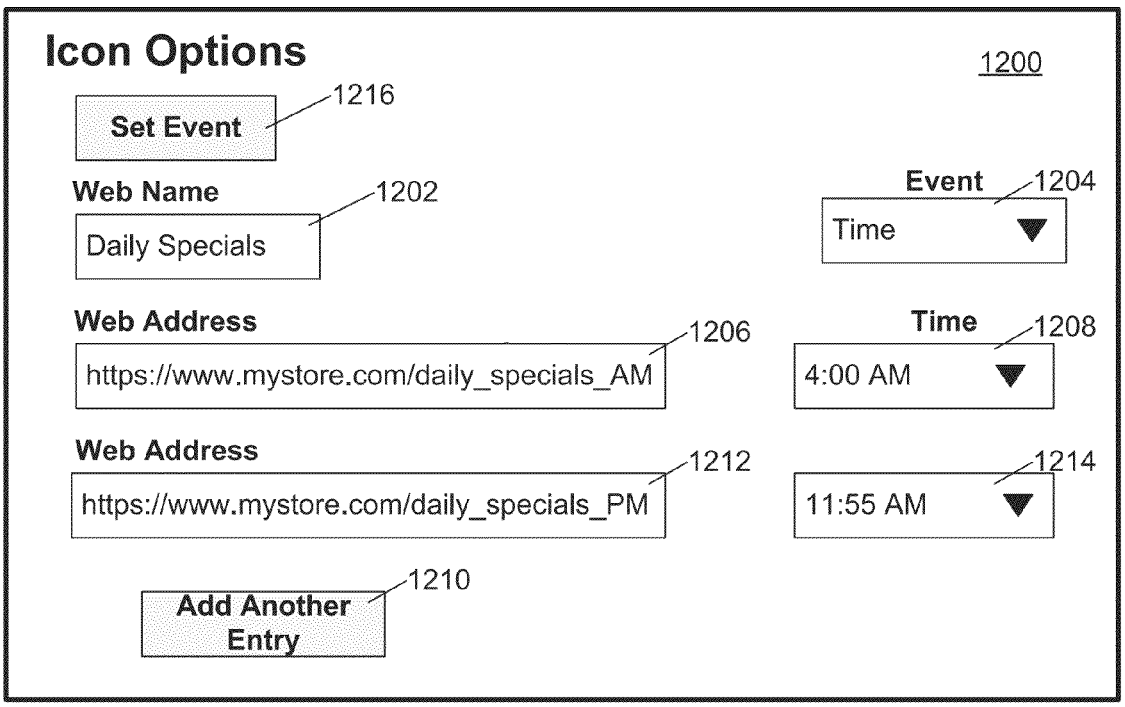
FIG. 12 is an example of an implementation of an input dialog for setting events for a selectable icon.

Turning to FIG. 12, an example of an implementation of an input dialog "Icon Options" 1200 for setting events for a selectable icon is depicted. The name of the selectable Icon may be entered in a "Web Name" text box 1202 that identifies the selectable icon being configured, such as Daily Specials. A type of event may be selected by use of a pull down menu "Event" 1204. Examples of the different types of events include date, time, temperature, alarm, or other predetermined defined event. The web address of the different versions of the data to be accessed by the event is entered in a "Web Address" text box 1206. In some implementations, this may be a searchable directory structure with a selected file's address being placed in the text box. The predetermined event is associated with the Web Address 1206. In the current time example, a pull down menu 1208 is used to enable a time to be selected. In other implementation, other types of entry structures may be used, such as a text box, button, or sliders. If addition events are to be defined for the same selectable image icon, then "Add Another Entry" button may be selected. Upon selection of the "Add Another Entry" button 1210, an additional "Web Address" text box 1212 is placed in the "Icon Options" 1200 window along with another pull down menu 1214. The configured events are then associated with the selectable icon after the events have been configured in the Icon Options window 1200 and the "Set Event" button is selected 1216.

In the example depicted in FIG. 12, whenever the daily special icon is selected in a signature the daily specials are shown. If the time is 4:00 am until 11:55 am, the daily_specials_AM data is provided. If the time is after 11:55 am, then the daily_specials_PM are provided. In other implementations, the selectable icon may be associated with weekly or daily specials that are date dependent. For example, after Christmas (December 26) sales flyers would not be displayed on December 27$^{th}$. Whenever the email is open and the icon is selected, the current sale information may be shown. In yet other implementations, the selectable icon may be associated with press releases and when selected, the most recent press release may be displayed.

Figure 13:
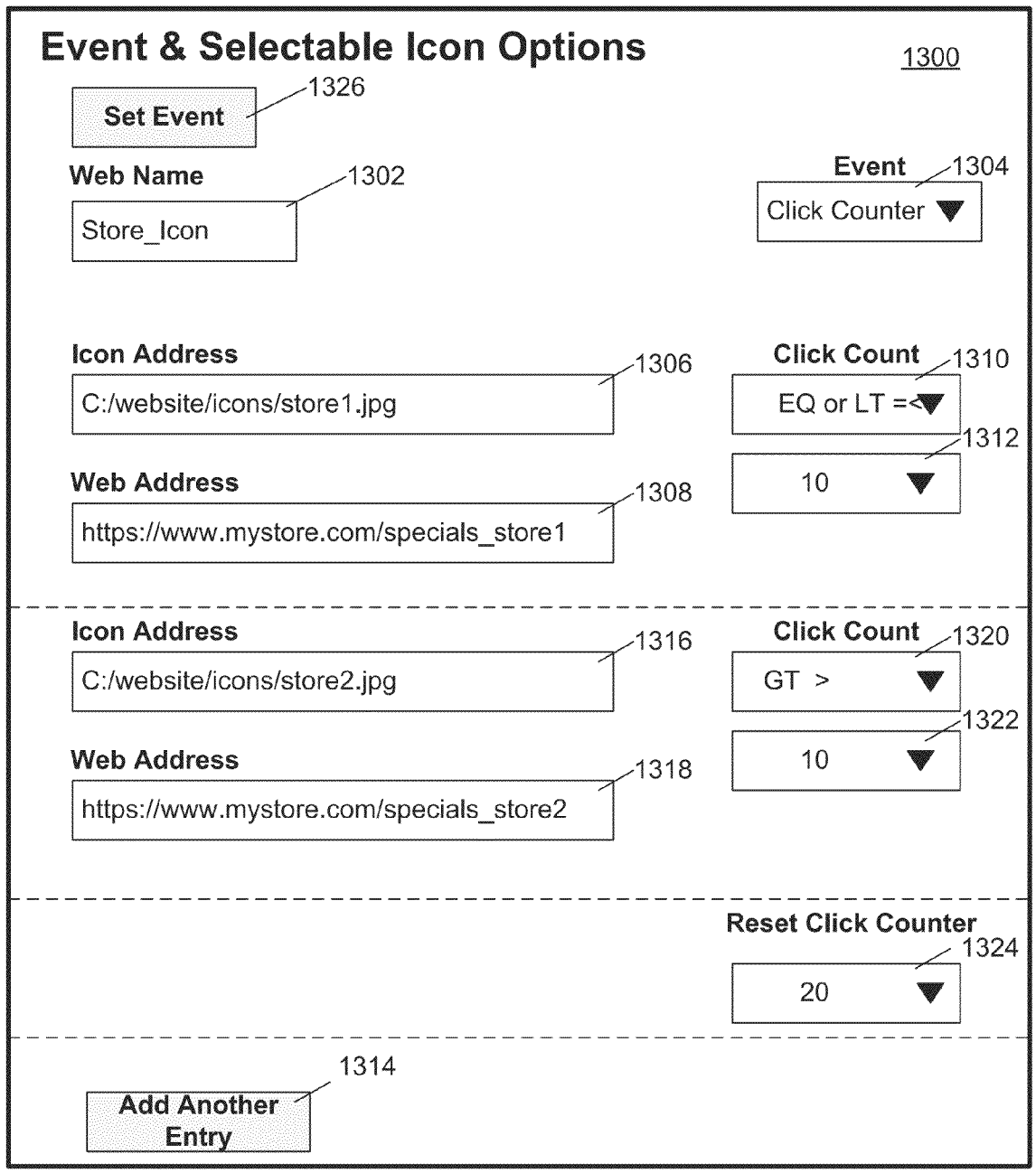
FIG. 13 is an example of an implementation of an input dialog for setting events and selectable icons based upon an event.

Turning to FIG. 13, an example of an implementation of an input dialog 1300 for setting events and selectable icons based upon a counter event is depicted. A user selects "Event & Selectable Icon Options" and is presented a display with an input dialog 1300 by the processing unit in a computer or server. A Selectable Icon Name 1302 may be assigned to the event, e.g. "Store_Icon" in the current example. The type of event may then be selected from an event pull down menu 1304. Examples of the types of events for changing selectable icon and/or associated data may include Times Accessed, Operating System, Weather (temperature, rain, etc.), Geographic Area, Date, and Time. In FIG. 13, the selected event is a click counter from drop down menu 1304. An icon address may be entered 1306 that may identify the location of the icon image to be displayed when the click counter is equal to or less than ten as selected by drop down menu 1310 and 1312. Another icon image may be selected for a different click count by selecting "Add Another Entry" button 1314. Additional boxes are then made available for entry of information. Another icon address may be entered in the "Icon Address" box 1316. In FIG. 13, the additional icon image is "store2.jpg". The web address associated with the icon identified in 1316 is entered in "Web Address" box 1318. The click count is selected by a drop down menu 1320 to be greater than and the count is selected to be "10" in box 1322. A "Reset Click Counter 1324 may be set so the click counter is reset every time the click counter reaches 20.

The web interface may also include buttons to modify the layout of the signature under construction. Signature layouts may, for example, apply different styles to the text information of the signature under construction. For example, different layouts may apply different graphics or typefaces, text styles (e.g., bold, italic, oblique, etc.), and colors to the signature under construction. Layouts may also modify additional or alternative aspects of the signature under construction. When configuration of the events and icons is complete, they may be committed for execution by selecting the "Set Event" button 1326. In other implementations, additional checks may occur to verify that an icon and data are associated with all possible events, in the current case counts between 0 and 20. If a lapse in configuration occurs, then the first entry for the icon and data may be used as default values.

Once the event is set, whenever the selectable icon "Store_Icon" is included in a signature block, the configured event associated with that icon is accessed when the electronic mail is opened. The icon store1.jpg is displayed in the electronic mail if the click count is equal to or less than 10. When the Store_Icon (appearing as image store1.jpg) is selected, then the specials_store1 web address is accessed and the current sale flyer is shown. Upon Store_Icon being accessed more than 10 times, the Store_Icon would appear as image store2.jpg with the sales information for that store located at a different website. This is just an example showing how events, selectable icons, and associated data all interact.

A counter event may be used to direct a user to a premium or other special site after a predetermined number of clicks that the user has made. In other implementations, the number of clicks may be total number of clicks from anyone who access the site. Upon a predetermined number of total clicks to the site, a user may be directed to a different page or site. In yet another implementation, a click counter may be configured to count the number of clicks per time period, such as per day. If a user clicks on the selectable icon a predetermined number of times during a day, they may then be sent to different website.

In another example, when an electronic mail is open, a message or request is sent to the server that selects the icons for inclusion in the signature block. Information that may be sent to that server include, the time of day, date, operating system of device opening the electronic mail, geographic information (location and/or data associated with location) to give but a few examples. The information or a portion of the information may be used when selecting the selectable icons for inclusion in the signature block of the opened electronic mail. For example, if the request is from an APPLE IPAD, then an icon associated with the APPLE app store may be included in the signature block of a requesting email. If the request is from an ANDROID device, then the icon may be associated with the ANDROID app store.

In yet another example, the message or request sent to the server when an email or electronic content is opened may include information about the computer and/or network that the electronic content message or request originated from. This information may be used with security and/or confidentiality measures to indicate that an unauthorized computer or network is accessing the link or report on the computer or network accessing the link. Access may be restricted by the server providing instructions to disable the links to the electronic content.

An exception list may limit access to linked content to indicated IP address, networks, or email accounts. For example, only IP addresses on the exception list may access a linked document. A blocking list may prevent or limit the IP addresses, networks, or email accounts from accessing linked electronic content. For example, an IP address in the blocking list is not able to access linked content when the selectable icon is selected by a blocked user. Furthermore, reporting of access may occur whenever an attempt to access linked content occurs. In all of these examples, a message may be generated and sent to the original sender of the email reporting on the indicated activity.

The security and confidentiality feature may also limit access to linked electronic content based upon any of the data either received in the message or request or accessible by the server. For example, linked electronic content may only be accessed by desk top computers and not mobile devices where the identification may be based upon operating system information received in the message or request. Another example is where links may be disabled after a predetermined number of days or number of times the electronic content has been accessed.

Figure 4:
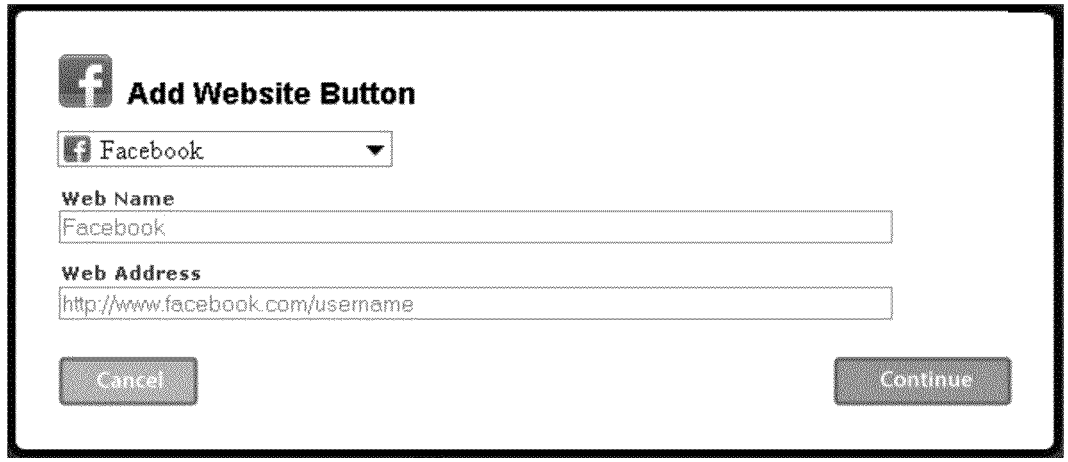
FIG. 4 is an example of an implementation of an input dialog of a web interface of a graphic-based electronic signature management system.

With reference to FIG. 3 and FIG. 4, the web interface, in this example, also includes a button to add additional web pages or links to the signature under construction. Upon selection of the button to add an additional web page, the web interface displays a dialog to collect information about the web page. As seen in FIG. 4, the dialog may include a drop-down list that includes a default set of additional web pages to add (e.g., Facebook, LinkedIn, Twitter, Skype, YouTube, Blogger, etc.). If the user selects one of the default additional webpages, the favorites icon for the webpage may be used as the image file for the selectable icon in the signature under construction. In the example dialog shown in FIG. 4, Facebook has been selected, and the Facebook icon is used as the image file for the selectable icon. A user may alternatively select to specify a non-default webpage. The dialog, in this example, includes textboxes to receive the name of the webpage and the webpage address. Once a user has input the webpage information, the user may select the "Continue" button and the signature builder adds a selectable icon for the web page to the signature under construction.

When a user is finished creating or modifying a signature, the user may save the signature to the data store by selecting a save button (not shown). Once a signature is saved, the user may export the signature 142 from the graphic-based electronic signature management system for use in electronic communications 136 such as, for example, email messages.

Figure 5:
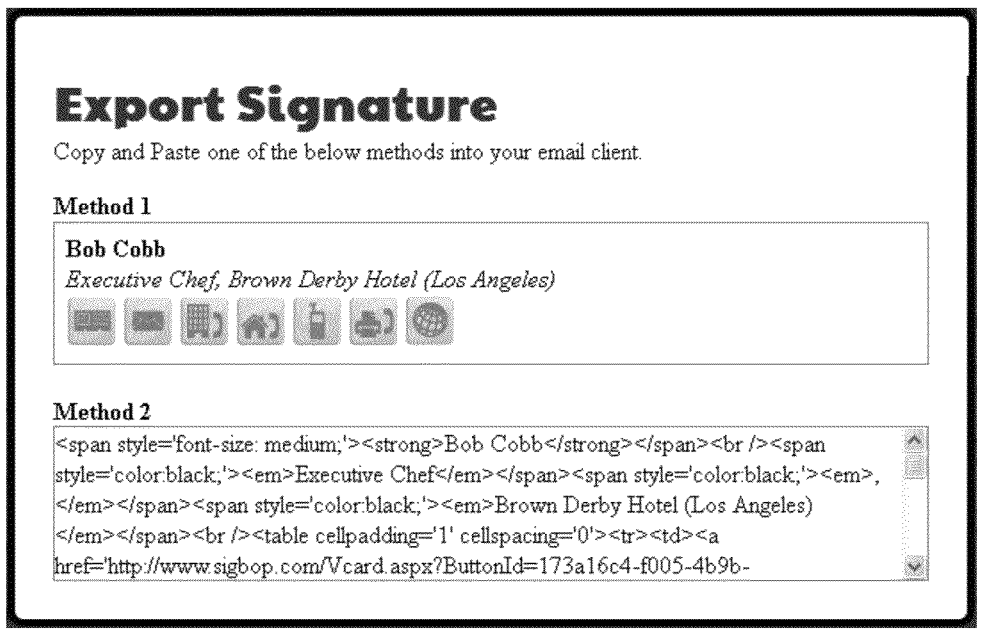
FIG. 5 is an example of an implementation of an export dialog of a web interface of a graphic-based signature management system.

Referring to FIG. 1, FIG. 3, and FIG. 5, the web interface displays an export dialog in response to selection of an export button. In this example, the export dialog presents the signature in two different formats. According to the first format, the graphic-based electronic signature is presented the same as the signature under construction in the preview display of FIG. 3. In this example, the first format presents the signature as two lines of text for the name, title, and company of the user, and a third line that includes the set of selectable icons respectively associated with the contact information items. According to the second format, the graphic-based electronic signature is presented as a set of markup data. This second signature format will be discussed in further detail below with reference to FIG. 7.

Regardless of the format selected, the user may copy (e.g., "copy-and-paste") the graphic-based electronic signature and save the signature to a local memory (not shown) at the user client device. Referring back to FIG. 1, the graphic-based electronic signature is thus available to be inserted into (i.e., pasted into, appended to, etc.) an electronic communication such as, for example, an email or webpage. In some example implementations, a user may manually copy-and-paste the signature into an electronic communication. Additionally or alternatively, the graphic-based electronic signature management system may include an insertion module that resides at the user client device and that is in signal communication with the communication application 136 that generates the electronic communication 138. The insertion module 140 may be, for example, an "extension" or "plug-in" that inserts the graphic-based electronic signature into an electronic communication. The insertion module may be configured to insert the signature automatically in response to the creation of an electronic communication or on-demand in response to receipt of an insertion command received at the user client device 104 as user input.

Figure 8:
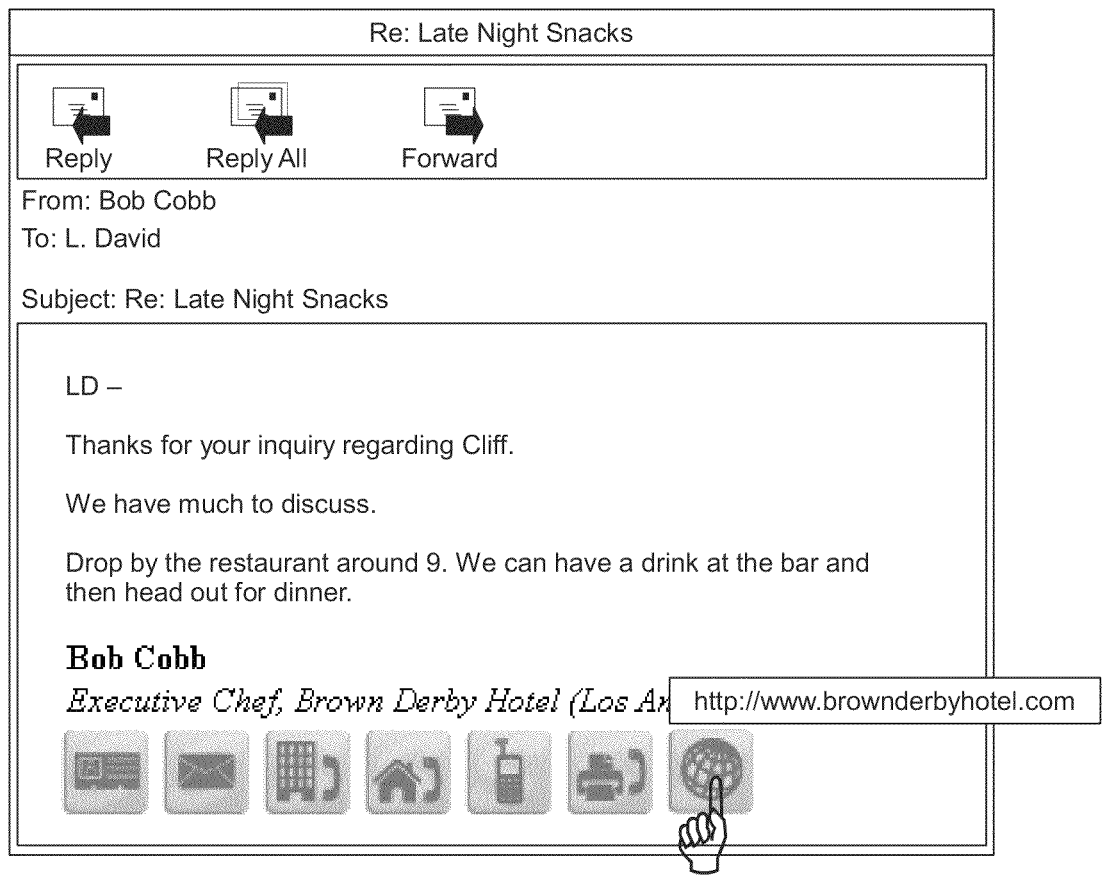
FIG. 8 is an example of an electronic communication that includes the example graphic-based electronic signature of FIG. 6.

With reference to FIG. 8, the user client device may then transmit the electronic communication to a recipient client device via a network, e.g., the Internet. The recipient client device may also include a communication application (e.g., an email client, web browser, etc.) configured to display the electronic communication to a recipient at the recipient client device. The graphic-based electronic signature is also presented to the recipient upon display of the electronic communication. As discussed below, the signature is displayed as an array of selectable icons with each icon respectively associated with a contact information item. The recipient may hover a cursor over an icon to display the contact information associated with that icon in a popup dialog. The recipient may also select an icon to initiate an electronic communication using the contact information associated with the icon.

Graphic-Based Electronic Signature

Each contact information item included in the graphic-based electronic signature is displayed as a selectable icon. With continued reference to FIG. 1, the data store may store image files used for the selectable icons in the signature. Suitable image file formats include, for example, PNG (Portable Network Graphics), GIF (Graphics Interchange Format), JPEG (Joint Photographic Experts Group), and the like. The image files may, for example, have dimensions of 32 pixels by 32 pixels. Additional or alternative dimensions may be selectively employed.

The signature builder may initially use a respective default image file for the selectable icons associated with contact information items of the signature. The image files of the selectable icons may indicate the type of contact information item the selectable icon is associated with. For example, an image of a telephone may indicate the contact information item is associated with a telephone number; and image of an envelope may indicate the contact information item is associated with an email address; and an image of a globe may indicate the contact information item is associated with a webpage address.

Users may also choose a user-selected image file as a selectable icon that is associated with contact or other electronic information. For example, the user may upload an image file for remote storage at the data store and associate with user-selected image file with a selectable icon of a contact information item in the signature. Where the contract information item is a webpage address, the user may instruct the signature builder to use the favorites icon associated with the webpage address (i.e., "favicon," shortcut icon, bookmark icon, etc.). The system may transmit a request for the favorites icon to the web server that hosts the webpage. Upon receipt of the favorites icon at the system, the system may store the favorites icon in the data store for use in the signature under construction. Alternatively, the data store may store a reference to the favorites icon stored at the web server for the webpage. In other implementations, a user selectable image may be used as the selectable icon that is selected from a web site such as GOOGLE IMAGE, rather than a predefined image such as an image of a telephone.

The data store stores image files using a filename associated with the image file, e.g., PRIMARYEMAIL.PNG, PRIMARYFAX.PNG, WORKPHONE.PNG, etc. The graphic-based electronic signature, in this example, includes a reference to the image file stored remotely at the data store. If a user desires to change the image file for a selectable icon in an existing signature, the user may simply change the image file associated with the filename. For example, the user may upload a new image file having the same filename or associate the existing image with a new URL; the old image file or URL association will be replaced or archived at the data store, and signatures that reference the filename will display the new image associated with the filename or be associated with the new URL. In this way, users may update the image file for a selectable icon, and the most up-to-date image file will be displayed upon viewing an electronic communications—even upon viewing previously transmitted electronic communications or link to different content.

Figure 6:
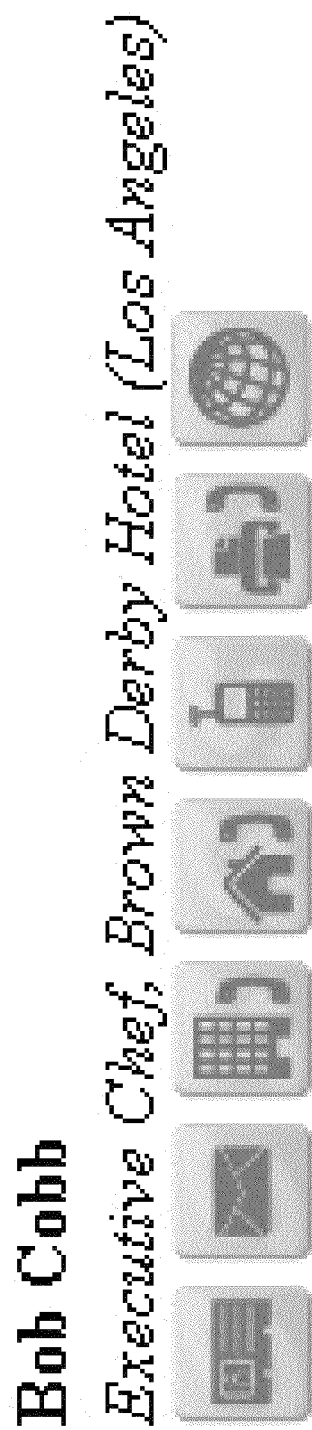
FIG. 6 is an example of a graphic-based electronic signature.

With additional reference to FIG. 6, an example of a graphic-based electronic signature is shown. The graphic-based electronic signature in FIG. 6 corresponds to the signature under construction in FIG. 3 above. The graphic-based electronic signature includes an array of one or more selectable icons. The signature in this example also includes the name, title, and company of the user above the array of selectable icons as previously shown in FIG. 3. Each selectable icon, in this example, is associated with a different contact information item. In the example signature shown in FIG. 6, the graphic-based electronic signature includes selectable icons for: an electronic business card (i.e., vCard), an email address; a work telephone number; a home telephone number; a mobile telephone number; a fax number; and a webpage address.

As mentioned above, the icons of the graphic-based electronic signature are selectable. Selecting one of the selectable icons in the signature may initiate an electronic communication using the contact information associated with the selectable icon (e.g., an email address, telephone number, webpage, etc.) via a communication application that corresponds to the type of contact information for the selected icon (e.g., an email client, telephone application, or web browser). To initiate an electronic communication, the signature may include a URI scheme (Uniform Resource Identifier) with the contact information. For an email address, for example, the signature may include, "mailto:email@address.com"; for a telephone number, "tel:+1-(123)-555-1234"; and for a webpage, "http://www.webpage.com". Accordingly when a recipient selects, i.e., "clicks," one of the selectable icons, a communication application is initiated based on the URI scheme associated with the contact information item of the selected icon. The recipient may then transmit an electronic communication via the communication application using the contact information of the selected icon.

Once a user has constructed a graphic-based electronic signature, signature-related information for the signature may be stored at the data store. Signature-related information for the signature may include, for example: a unique identifier for the signature; a unique identifier for each of the selectable icons included in a signature; information that specifies which contact information items are included in the signature; the image files associated with the selectable icons of the signature; and the arrangement of the selectable icons within the signature. The data store may also store additional or alternative types of signature-related information. The signature builder retrieves this signature-related information from the data store when a user selects to modify an existing signature.

The additional or alternative type of signature-related information may include time based signature-related information or location based signature information. Time based signature-related information enables at least part of the data associated with a selectable icon to be selectable based upon the time of day, day of week, month or year. For example. A selectable icon for a restaurant may provide contact information along with breakfast specials in the morning and contact information and dinner specials in the afternoon. In other implementations, different selectable icon with different links may be displayed when an electronic mail message is opened. When opening the electronic mail in the morning, the selectable icon may have an icon image of eggs and when clicked on takes you straight to breakfast menu. But, when opening the same electronic mail message in the PM, the selectable icon image may be of an image of steak and candles, and clicking on the selectable icon results in a dinner menu being displayed. Either way, regardless of when electronic mail was opened, when clicking on button, link changes depending on time of day. Location based signature information may be used if a user's location is identified via browser data, GPS/cellular location services or internet address. Location Based signature-related information enables at least part of the data associated with a selectable icon to be selectable based upon the location of the user.

The graphic-based electronic signature may be implemented, for example, as a set of markup data using a markup language such as, e.g., XML (eXtensible Markup Language) or HTML (HyperText Markup Language). Additional or alternative approaches to implementing the graphic-based electronic signature may be selectively employed.

Referring to FIG. 7, an example of an implementation of a graphic-based electronic signature is shown. The graphic-based electronic signature, in this example, is implemented using HTML. As seen in the example signature shown in FIG. 7, the signature includes an array of selectable icons and respectively associated contact information items. The signature, in this example, also includes a URI scheme (e.g., mailto:, tel:, and http:) respectively associated with each contact information item for initiating a communication using the contact information item.

The selectable icons include a reference to the associated image file stored remotely at the system. The selectable icons, in this example, also include an "alt" tag (alternative text) that specifies the contact information associated with the selectable icon. In this way, the contact information may be rendered as a tooltip when a cursor (e.g., mouse pointer) hovers over the selectable icon.

For a selectable icon relating to a webpage ("webpage icon"), the webpage address may be included in the graphic-based electronic signature. When a recipient selects a webpage icon, a web browser may transmit a request for the webpage specified by the webpage address associated with the webpage icon. Alternatively, however, the signature may include a reference to a webpage address stored remotely at the graphic-based electronic management system as shown by way of example in the signature of FIG. 7. In this alternative approach, the data store may store an association between a webpage icon and the webpage address for the webpage icon. When a recipient selects the selectable icon for a webpage in this alternative approach, a web browser may transmit a request to the graphic-based electronic signature management system, and the request may include the unique identifier (e.g., "ButtonId") for the webpage icon. Upon receipt of the request, the system performs a lookup in the data store based on the unique identifier for the webpage icon and determines the webpage address associated with the webpage icon. The system then sends a response to the web browser that redirects the web browser to the webpage address associated with the webpage icon. In this way, the system may track webpage click responses and keep older data updated with new information.

As mentioned above, the graphic-based electronic signature, in this example, includes references to the image files stored remotely at the data store. Accordingly, the communication application at the recipient client device may request the image file associated with a selectable icon whenever the electronic communication is displayed at the recipient client device. When the communication application displays the electronic communication, the communication application interprets the contents of the electronic communication, which includes, in this example, the graphic-based electronic signature and accompanying image file references. The communication application generates a request (e.g., an HTTP request), for an image file and transmits the request to the graphic-based electronic signature management system. In response to receipt of the request, the system may transmit a response (e.g., an HTTP response) that includes the requested image file. Because the communication application, in this example, interprets the electronic communication and requests the image files upon each display of the electronic communication, the signature may reflect changes to the signature after the recipient received the electronic communication. If a user changes the icon associated with one of the selectable icons, for example, the system transmits the most up-to-date icon to the recipient client device. The signature displayed may also reflect changes where a user removes a contact information item and selectable icon from a signature. When a user removes a selectable icon and contact information item from a signature, the system will not transmit a response to the recipient client device that contains an image file for the removed selectable icon. Because there is no image file to display, the graphic-based electronic signature will not include a selectable icon and the accompanying contact information for the removed selectable icon.

As an example, consider a graphic-based electronic signature that includes selectable icons for a webpage and a mobile telephone number. The selectable icon for the webpage, in this example, is associated with a default webpage icon. A user transmits an electronic communication to a recipient that includes the example signature. When the recipient client device displays the electronic communication, the signature includes selectable icons for the webpage and the mobile telephone number. The communication application at the recipient client device transmits requests for the image files associated with the selectable icons for the webpage and mobile telephone number. The graphic-based electronic signature management system transmits the requested icons in response, including the default webpage image file for the webpage icon. Consider now that the user subsequently changes the example signature to remove the mobile telephone number and to use the favorites icon for the webpage icon rather than a default webpage image file. When the recipient client device displays the example signature subsequent to the changes, the recipient client device, in this example, again transmits requests for the image files associated with the webpage icon and the mobile telephone icon. Due to the changes, however, the system transmits one response that includes the new favorites icon for the webpage and one response that does not include an image file for the mobile telephone number. Accordingly the example signature displays the favorites icon for the webpage icon. Additionally the example signature does not display a selectable icon for the mobile telephone number and by extension does not display the contact information for the mobile telephone number since the recipient client device did not receive an image file for the mobile telephone number icon. In some example implementations, if additional icons or links are added to a signature after it has been transmitted, the signature may be updated. The updating may occur when the management system responds to recipient client device.

Click Responses

As mentioned above, the graphic-based electronic signature management system may be configured to track selections of webpage icons or links at a recipient client device 144. Still referring to FIG. 1, the communication application (e.g., a web browser) 146 at the recipient client device may transmit a request (e.g., an HTTP request) to the graphic-based electronic signature management system upon selection of a webpage icon or link. The request may include a unique identifier that identifies the webpage icon or link selected. These requests may be referred to, in this example, as click responses. The application server of the system may include a click response manager that receives the click responses.

In response to receipt of a click response 148, the click response manager 134 may update a record in the data store 114 that indicates the number of times the selected web page icon or link has been selected. The record that tracks the number of click responses may be, in this example, associated with the record for the webpage icon or link stored at the data store. The click response manager may also perform a lookup in the data store for the webpage address associated with the selected web page icon or link. The click response manager may then generate a response that includes the webpage address for the selected webpage icon or link and transmit the response back to the recipient client device such that the communication application is redirected to the webpage address for the selected webpage icon or link included in the response. In this way, the system may advantageously keep track of how many times a recipient selects a webpage icon or link of a graphic-based electronic signature.

Signature Sponsorships

The graphic-based electronic management system may also be configured to receive third-party contact information items 150 from third parties via third-party client devices 152. The third-party contact information items 150 may be similarly associated with third-party selectable icons as discussed above. When creating a graphic-based electronic signature, users may select to include one or more of the third-party contact information items in a signature under construction. The third-party contact information items 150 may include, for example, webpage addresses designed to drive to drive traffic to third-party websites.

The graphic-based electronic signature management system may track the selections of the third-party selectable icons included in the signature of a user as discussed above.

The third-party may compensate the user based on the number of selections of third-party selectable icons included in a signature of the user. In this way, the system advantageously creates incentives for third parties to sponsor graphic-based electronic signatures in order to drive traffic to third party websites and links. The system also advantageously creates incentives for users to include third-party contact information items in the signatures by compensating users when recipients select the third-party selectable icons. The graphic-based electronic management system may also be configured to replace the third-party contact information items. The replacement may be manual or automatic such as, for example, when a sponsor is terminated.

Graphic-Based Electronic Signature Management Method

Figure 9:
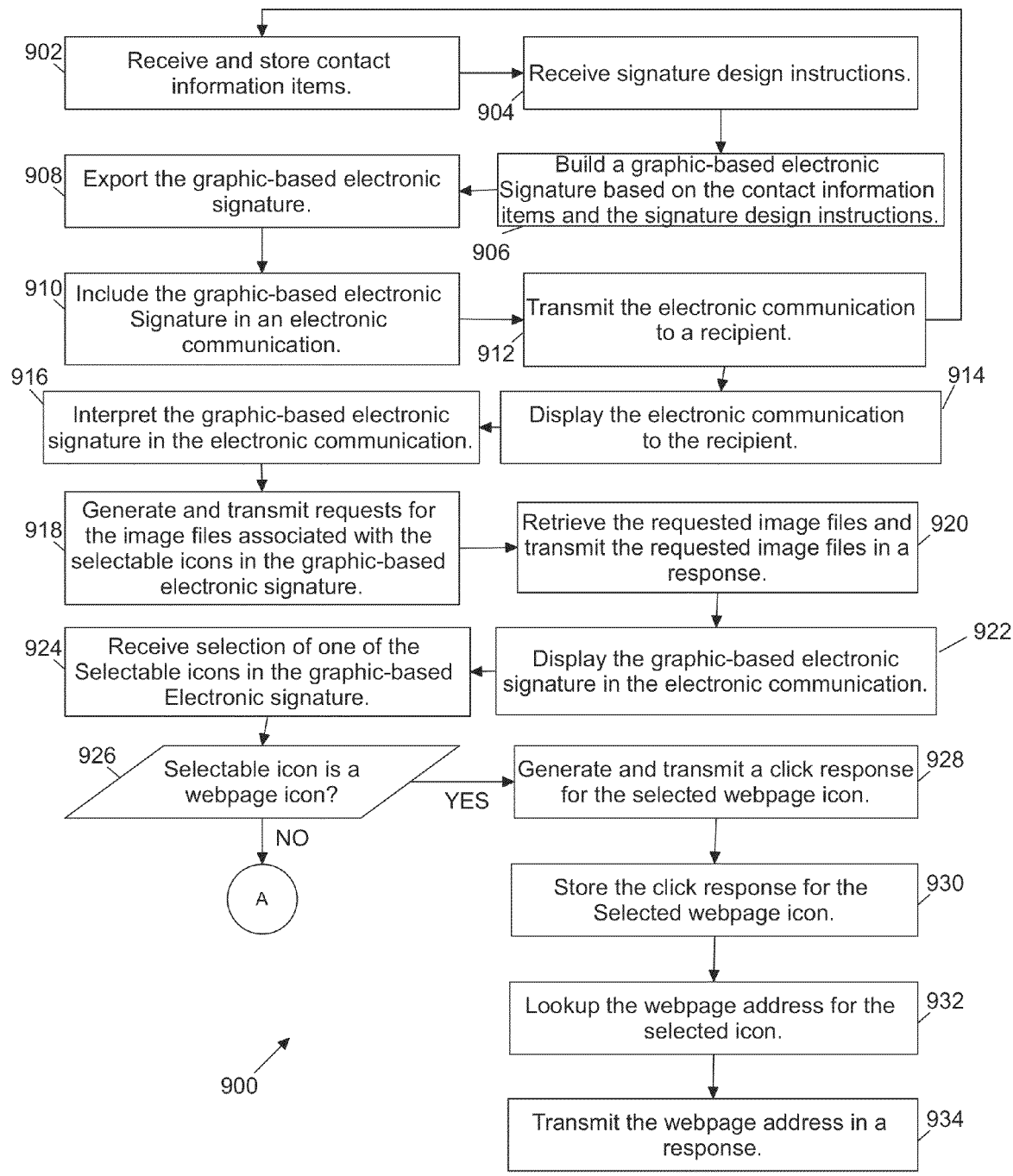
FIG. 9 is a flowchart of example method steps for managing a graphic-based electronic signature.

Referring now to FIG. 9, a flow diagram 900 of example steps for managing a graphic-based electronic signature is shown. As seen in FIG. 9, contact information items are received and may be stored at a data store (step 902). Signature design instructions are also received (step 904). A graphic-based electronic signature is built based on the contact information items and the signature design instructions (step 906). As discussed above, the graphic-based electronic signature includes one or more selectable icons that are respectively associated with a contact information item. A graphic-based electronic signature may include one or more default selectable icons, one or more user-selected selectable icons, one or more third-party selectable icons, or a combination of default icons, user-selected icons, and third party icons.

Once a graphic-based electronic signature has been built, the signature is exported (step 908) and may be included in an electronic communication (step 910), e.g., an email or webpage. The electronic communication that includes the graphic-based electronic signature may be transmitted to a recipient client device (step 912). The electronic communication may be displayed to the recipient using a communication application (e.g., an email client, web browser, etc.) at the recipient client device (step 914).

When the communication application at the recipient client device displays the electronic communication, the communication application interprets the graphic-based electronic signature (step 916). The communication application generates and transmits requests for the image files respectively associated with the selectable icons in the graphic-based electronic signature (step 918). In response to receipt of the requests, the requested image files are retrieved and transmitted back to the communication application in a response (step 920). The communication application then displays the graphic-based electronic signature as an array of selectable icons (step 922).

The recipient may then select one of the selectable icons in the graphic-based electronic signature (step 924). If the selected icon is a webpage icon (step 926), then, in this example, a click response is generated and transmitted to track the selection of the selected webpage icon (step 928). The click response is stored (step 930), and a lookup is performed to determine the webpage address for the selected webpage icon. (step 932). The webpage address for the webpage icon is transmitted back in a response (step 934), and an electronic communication using the webpage address may be initiated (step 936).

Figure 10:
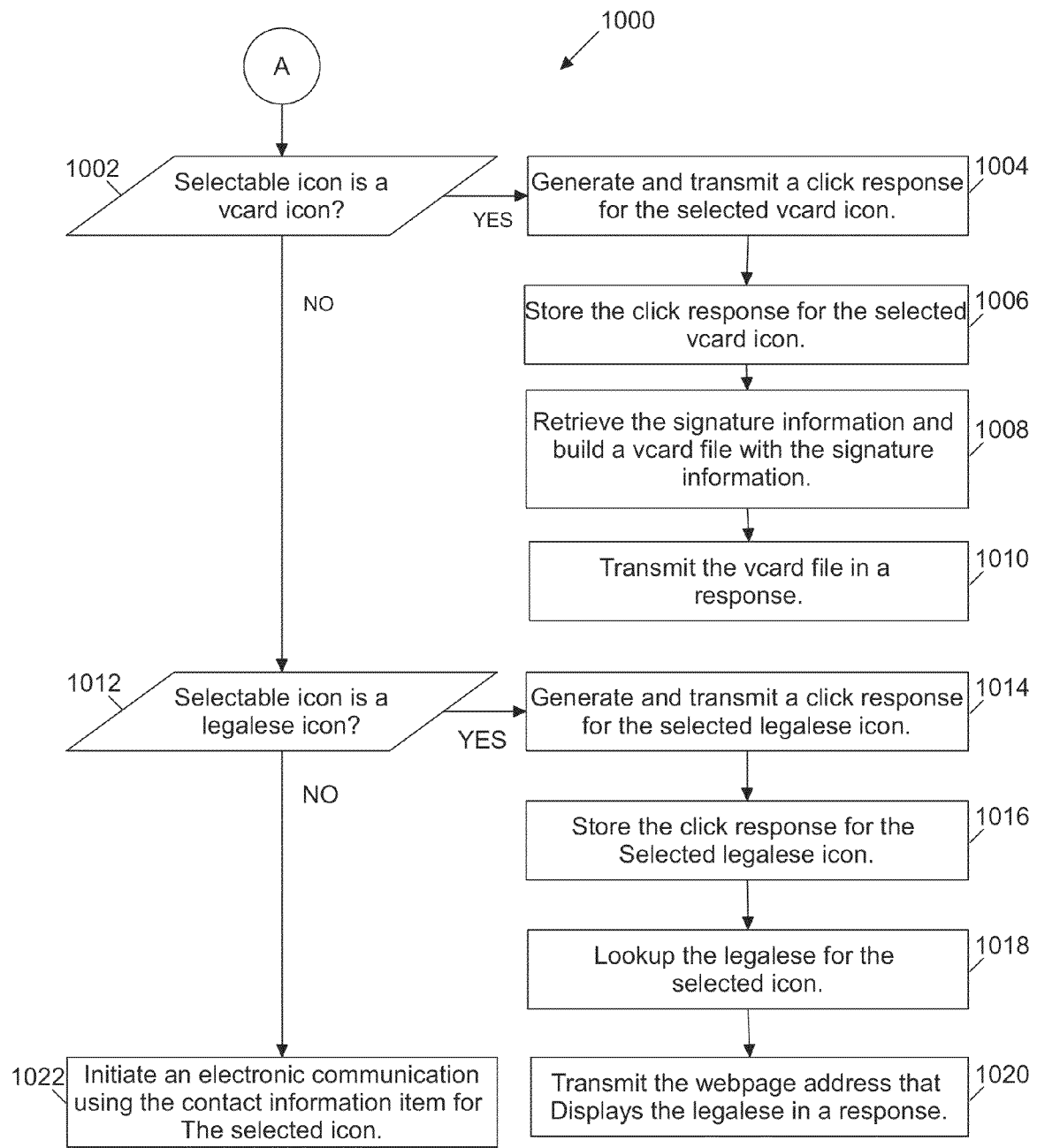
FIG. 10 is a continuation of the flowchart of FIG. 9.

FIG. 10 is a flow diagram of example steps for managing a graphic-based electronic signature when the selectable icon is not a webpage icon. If the selected icon is not a web page icon (step 926 in FIG. 9), then, in this example, whether the selectable icon is vCard icon or a legalese icon is determined.

If the selectable icon is a vCard icon (step 1002), then a click response is generated and transmitted for the vCard icon as discussed above (step 1004). The click response for the vCard icon is stored as discussed above (step 1006). The signature information for the signature associated with the vCard icon is retrieved to build a vCard file (step 1008), and the vCard file is transmitted back to the user that selected the vCard icon in a response (step 1010).

If the selectable icon is a legalese icon (step 1012), then a click response is generated and transmitted for the legalese icon (step 1014) as discussed above. The click response for the legalese icon is also stored as discussed above (step 1016). The legalese for the legalese icon is retrieved (step 1018), and a webpage address that displays the legalese is transmitted back to the user that selected the legalese icon in a response (step 1020).

If the selectable icon is not a webpage icon, vCard icon, or legalese icon, then the selectable icon, in this example, is a contact information icon, and an electronic communication using the contact information item associated with the selectable icon is initiated (step 1022). In other example implementations, other types of electronic content may be associated with the selectable icon, including .wav files, ADOBE .pdf files, web pages, etc . . . .

Additional Technical Details

The electronic signature may also contain information associated with validating the signature as being supplied by a trusted provider. In other implementations, the electronic signature may contain information such as a recommendation value that is associated with a number of people recommending the person or service provided by the person. The recommendations may be collected by a user selecting a "Like" button in the signature. In yet, other implementations additional value added information may be included in the electronic signature such as type of sender information (friend, co-worker, solicitation, etc . . . ).

It will be understood and appreciated that one or more of the processes, sub-processes, and process steps described in connection with FIGS. 1-9 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIGS. 1-5, 7, and 9. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

Figure 2:
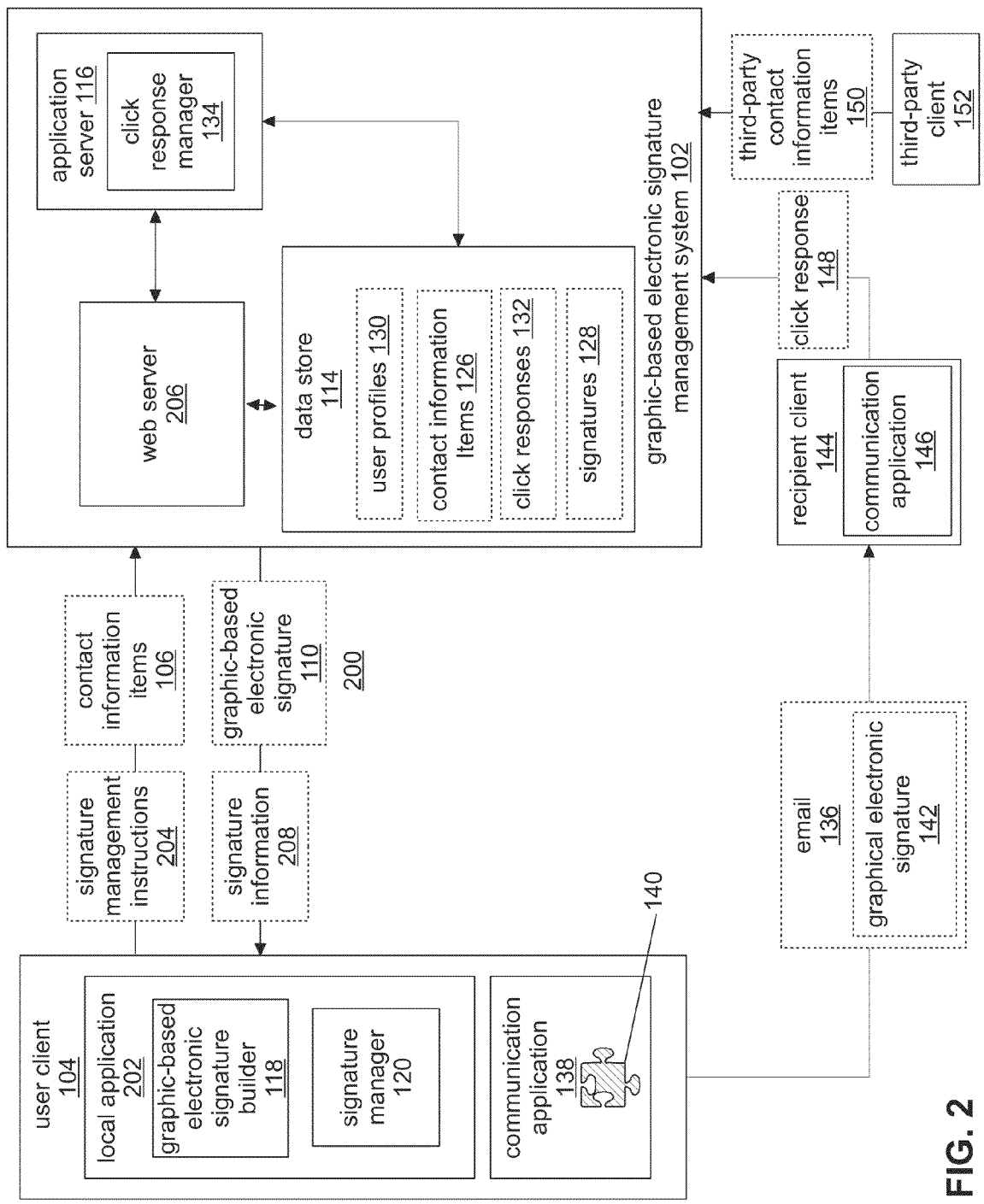
FIG. 2 is another example of an implementation of a graphic-based electronic signature management system.

The executable instructions may be implemented as a computer program product having instructions stored therein which, when executed by a processing module of an electronic system (e.g., a graphic-based electronic signature management system in FIGS. 1-2), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented system for managing an electronic signature comprising:
   a data collector implemented by a processor, receives one or more information items; a signature builder that builds a graphic-based electronic signature based on at least one of the information items, the graphic-based electronic signature includes a set of icons, the set of icons of the graphic-based signature includes respective icons for at least a webpage information item, and a social networking information item, wherein individual icons in the set of icons are respectively associated with at least one of the information items and the signature builder builds a single link associated with the graphic-based electronic signature for use as an electronic signature; and
   wherein individual icons in the set of icons are configured to initiate a communication application when one of the icons is selected in order to communicate via the communication application using the information item associated with the selected icon; and wherein the signature builder is configured to access signature-related information stored remotely relative to the signature builder, wherein the communication application is a first communication application until a predetermined event after which the communication application is a second communication application wherein said predetermined event is associated with configuring a web address.

2. The computer-implemented system of claim 1 wherein the set of icons of the graphic-based electronic signature includes at least one icon that is included in the set of icons based on a user-selection.

3. The computer-implemented system of claim 2 wherein:
   the data collector receives one or more third-party information items;
   the third-party information items are respectively associated with a set of third-party icons; and
   the at least one icon included in the graphic-based electronic signature based on the user-selection is selected from the set of third-party icons.

4. The computer-implemented system of claim 1 wherein the graphic-based electronic signature is included in an electronic communication in response to receipt of user input.

5. The computer-implemented system of claim 4 further comprising an insertion module in signal communication with the communication application such that the insertion module includes the graphic-based electronic signature in the electronic communication in response to receipt of user input at the communication application.

6. The computer-implemented system of claim 5 wherein:
   the communication application is an email application;
   the electronic communication is an email; and
   individual icons in the set of icons of the graphic-based electronic signature are displayed
   adjacent to one another when the graphic-based electronic signature is included in the email.

7. The computer-implemented system of claim 1 wherein the data collector receives one or more updated information items from the user and further comprising:
   a graphic-based electronic signature manager that associates the one or more updated information items with respective individual icons in the set of icons of the graphic-based electronic signature such that the graphic-based electronic signature includes the one or more updated information items when the graphic-based electronic signature is presented in an electronic communication.

8. The computer-implemented system of claim 1 further comprising a data store wherein:
   the signature builder configures individual icons in the set of icons of the graphic-based electronic signature to trigger a selection indication when one of the icons is selected, the selection indication includes identifying information relating to the selected icon; and the data store receives and stores the identifying information of the selection indication to provide a selection history that indicates which icons in the set of icons of the graphic-based electronic signature have been selected.

9. The computer-implemented system of claim 8, where the identifying information of the selection indication includes at least a web address and time.

10. The computer-implemented system of claim 1 wherein the signature builder configures at least one of the icons in the set of icons of the graphic-based electronic signature to display the information item associated with the icon in a pop-up dialog when a cursor hovers over the icon.

11. The computer-implemented system of claim 1 wherein the set of icons of the graphic-based signature includes respective icons for at least a telephone information item, an email information item, the webpage information item, and the social networking information item.

12. The computer-implemented system of claim 1, where at least one of the icons from the set of icons is an image that is selected from a remote location and formatted as an icon in the set of icons.

13. The computer-implemented system of claim 1 wherein the set of icons of the graphic-based electronic signature includes an icon and is configured to initiate a communication application for reporting time.

14. The computer-implemented system of claim 1 wherein the communication application is a first communication application until a predetermined event after which the communication application is a second communication application.

15. A computer-implemented system for managing an electronic signature comprising:
    a data collector implemented by a processor, receives one or more information items; a signature builder that builds a graphic-based electronic signature based on at least one of the information items, the graphic-based electronic signature includes a set of icons, the set of icons of the graphic-based signature includes respective icons for at least a webpage information item, and a social networking information item, wherein individual icons in the set of icons are respectively associated with at least one of the information items and the signature builder builds a single link associated with the graphic-based electronic signature for use as an electronic signature; and
    wherein individual icons in the set of icons are configured to initiate a communication application when one of the icons is selected in order to communicate via the communication application using the information item associated with the selected icon; and wherein the signature builder is configured to access signature-related information stored remotely relative to the signature builder, wherein said one or more information items includes analytic data, wherein the analytic data include time of day, date and IP address.

16. The computer-implemented system of claim 15 wherein the data collector receives one or more updated information items from the user and further comprising:
    a graphic-based electronic signature manager that associates the one or more updated information items with respective individual icons in the set of icons of the graphic-based electronic signature such that the graphic-based electronic signature includes the one or more updated information items when the graphic-based electronic signature is presented in an electronic communication.

17. The computer-implemented system of claim 15 further comprising a data store wherein:
    the signature builder configures individual icons in the set of icons of the graphic-based electronic signature to trigger a selection indication when one of the icons is selected, the selection indication includes identifying information relating to the selected icon; and
    the data store receives and stores the identifying information of the selection indication to provide a selection history that indicates which icons in the set of icons of the graphic-based electronic signature have been selected.

* * * * *